United States Patent [19]

Bobry

[11] Patent Number: 5,595,445

[45] Date of Patent: Jan. 21, 1997

[54] HAND-HELD OPTICAL SCANNER

[76] Inventor: Howard H. Bobry, 18416 Olympic View Dr., Edmonds, Wash. 98080

[21] Appl. No.: 579,438

[22] Filed: Dec. 27, 1995

[51] Int. Cl.⁶ .......................... H04N 1/047; H04N 1/107
[52] U.S. Cl. .......................... 400/88; 358/473; 382/313
[58] Field of Search .......................... 400/88, 120 HH; 358/473; 382/313, 315

[56] References Cited

U.S. PATENT DOCUMENTS

| | | | |
|---|---|---|---|
| 3,656,169 | 4/1972 | Kashio | 346/1 |
| 4,377,741 | 3/1983 | Brekka et al. | 235/472 |
| 4,611,246 | 9/1986 | Nihei | 358/256 |
| 4,797,544 | 1/1989 | Montgomery | 382/313 |
| 4,899,228 | 2/1990 | Sano et al. | 400/88 |
| 4,901,164 | 2/1990 | Kurosawa | 358/473 |
| 4,928,183 | 5/1990 | Yajima | 358/296 |
| 5,012,349 | 4/1991 | de Fay | 358/296 |
| 5,355,146 | 10/1994 | Chiu et al. | 358/473 |
| 5,446,559 | 8/1995 | Birk | 395/114 |

*Primary Examiner*—Edgar S. Burr
*Assistant Examiner*—Steven S. Kelley
*Attorney, Agent, or Firm*—Rankin, Hill, Lewis & Clark

[57] ABSTRACT

A hand-held and self contained electronic scanning apparatus for scanning information on a document disposed outside the apparatus includes a housing that can be manually positioned adjacent a surface of a document and manually swept across a scanning area on the medium during a scanning sequence; a scanner disposed in the housing and having a scan head with a plurality of scan elements such as light sensitive elements for scanning information as an image of the document within the scanning area; and an electronic control circuit disposed in the housing for controlling the scanner to scan information on the document during a scanning sequence, the control circuit comprising compensation for reducing image distortion based on detecting position of the light sensitive elements during a scanning sequence.

42 Claims, 9 Drawing Sheets

START POSITION (84)

DOCUMENT IMAGE SCANNED

FINISH POSITION (86)

DOCUMENT IMAGE AS STORED BY UNCOMPENSATED SCANNER

HAND-HELD OPTICAL SCANNER

BACKGROUND OF THE INVENTION

This application is related to the following co-pending U.S. patent applications Ser. No. 08/554,042 for "HAND-HELD ELECTRONIC PRINTER" filed on Nov. 6, 1995; and Ser. No. 08/554,043 for "HAND-HELD SWEEP ELECTRONIC PRINTER" filed on Nov. 6, 1995; the entire disclosures of which are fully incorporated herein by reference.

The invention relates generally to methods and apparatus for scanning or reading an image from a portion of a document, such as lines of text and images. More particularly, the invention relates to fully self contained and hand-held scanning apparatus that is operated, for example, using a sweeping motion of the apparatus across a selectable area of a document.

Hand-held scanners known heretofore have used external apparatus, such as a personal computer, for example, to receive, store, and process image information, and can exhibit considerable image distortion. This distortion arises from movement of the scan head along a nonlinear path. Additionally, in a hand controlled scanning device, it is possible to rotate the scan head such as by a pivoting action brought about by the natural tendency of an operator to allow the apparatus to tilt or rotate during a sweeping movement. This pivoting action changes the orientation of the scan head with respect to the document and thus can further result in distortion of the scanned image. In some cases, mechanical devices have been incorporated into the scanner to restrict or constrain movement to a linear path and to reduce the occurrence of a pivoting or rotational motion imparted to the apparatus. Such devices are less than desirable as the mechanical constraints reduce the flexibility of the apparatus, increase the apparatus size and weight, and restrict use of the scanner to flat surfaces. Therefore, information cannot be read from a three-dimensional object such as a book. Further, such devices typically block ambient illumination and require a supplemental light source to be built into the apparatus, increasing power requirements.

The objectives exist, therefore, for providing a more convenient apparatus and methods for a hand-held and operated fully self contained scanner that is responsive to a simple and unconstrained sweeping motion that exhibits reduced distortion in the recorded image caused by such sweeping motion, and that generally requires only ambient illumination.

SUMMARY OF THE INVENTION

To the accomplishment of the foregoing objectives, the present invention contemplates, in one embodiment, a hand-held and self contained electronic optical scanning apparatus for reading images from a document disposed outside the apparatus comprising a housing that can be manually positioned adjacent a surface of the document and manually swept across a selected area of the document during a scanning sequence; a scanner disposed in the housing and having a scan head with a plurality of light sensitive elements for detecting image information; and electronic control means disposed in the housing for controlling the scanner to scan an image on a document during a scanning sequence, the control means comprising compensation means for reducing image distortion based on detecting position of the light sensitive elements during a scanning sequence.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
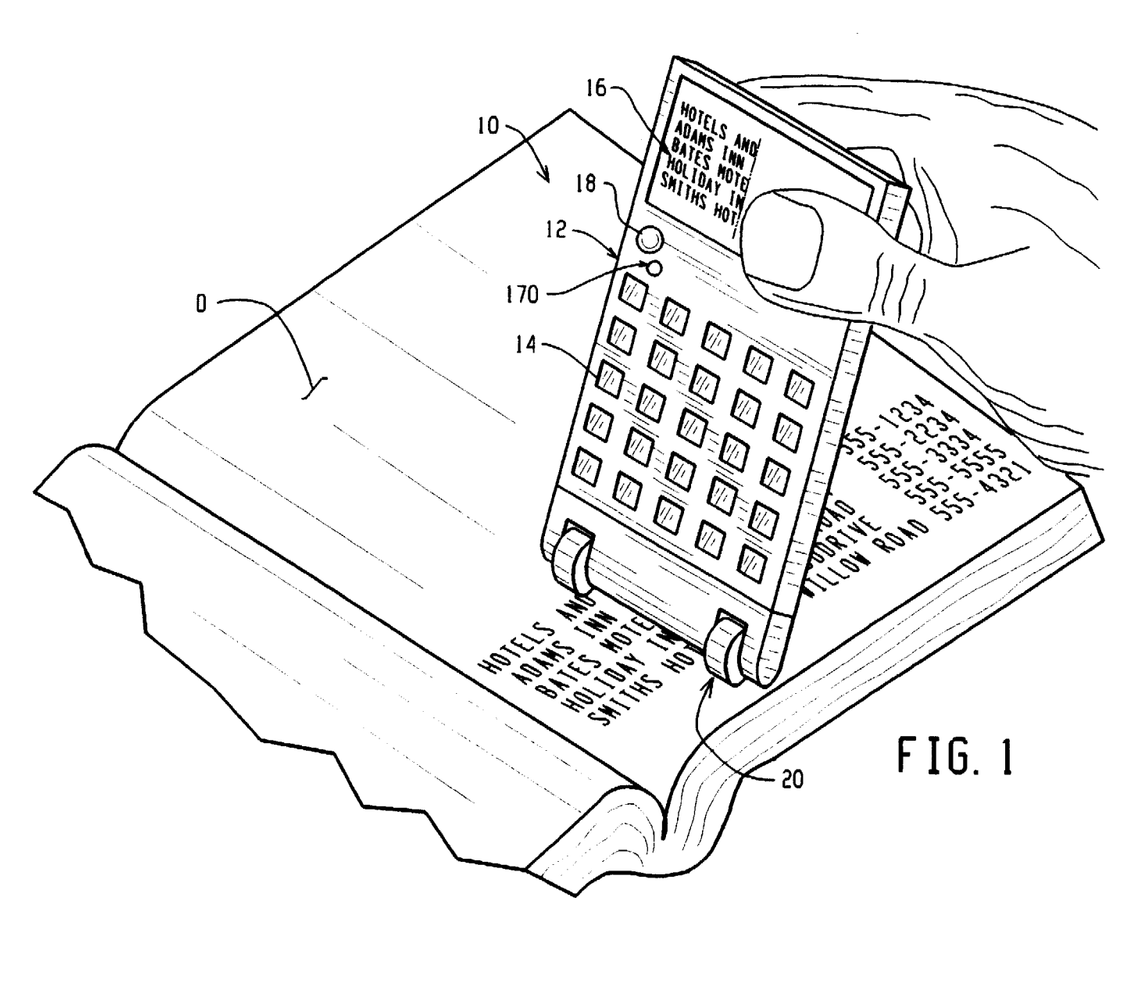
FIG. 1 is a simplified schematic perspective of a self-contained and hand operated scanning apparatus according to the present invention.

With reference to FIG. 1, an embodiment of the invention is illustrated in simplified schematic form for purposes of describing the basic concepts of the invention. In this exemplary configuration, a hand-held and operated scanning apparatus 10 is illustrated. A significant feature of this apparatus is that it is a completely self contained unit that can be manually operated without an external connection. However, as will be explained hereinafter, the apparatus 10 is equipped with interface devices, which can be hardwired connectors or wireless links, to permit external data output and/or control if so desired for a particular application.

In the embodiment of FIG. 1, the apparatus 10 is shown disposed adjacent a document, D, in this case an open book. Although the invention is illustrated and described herein with specific reference to scanning from a paper document, such as a book, letter, and so on, such description is exemplary for purposes of illustration and explanation and should not be construed in a limiting sense. Those skilled in the art will readily appreciate that the invention can be utilized for reading indicia, images, characters, bar codes, text and so on in virtually any color, as well as black or white, from any medium. The scanner mechanism can be selected from any number of commercially available units, or special made, depending on the particular application. In the embodiments described herein, the scanner mechanism is a charge coupled device (CCD), comprised of a number of individual light sensitive elements disposed in a linear array. In many applications of the invention, other scanner mechanisms both known and later developed will also be suitable for use with the present invention.

The apparatus 10 includes a housing 12 which for convenience may be made from metal, plastic, composites or other suitable material. The housing 12 preferably is a rigid structure that is capable of supporting a scanning mechanism therein along with an electronics package and an internal power supply, such as a battery. The housing 12 should also be sturdy enough to withstand manual forces applied to the structure to actuate the apparatus without damage or stress. The housing 12 should also provide a stable platform so that the apparatus 10 can be manually held and stably positioned adjacent the document D, as illustrated in FIG. 1, for example, and easily swept across the document. Further, the lower portion of housing 12 may be so shaped, or made of transparent material, so as to minimize obstruction of ambient illumination and the operator's view of the area-being scanned.

The housing 12 holds a key pad device 14, which for convenience can be a conventional push pad or thin membrane type key pad. The housing 12 also holds a display device 16 such as a conventional LCD or LED display. Internal to the housing 12 (not shown in FIG. 1) is a circuit board or boards which hold the various electronic components and power supply components for operating the electronic scanning apparatus 10.

Part of the control circuitry may include an interface device, such as, for example, a conventional transceiver 18, that transmits and receives data and/or instructions from a remote device (not shown) such as a personal computer, for example. A suitable transceiver device 18 is an infrared transceiver, although other communication links could be used such as RF, microwave, acoustic and so on.

In the embodiment of FIG. 1, the apparatus 10 is supported on the document during a scanning sequence by one or more rollers 20. These rollers 20 are coupled to encoder devices and will be explained in greater detail hereinafter. The rollers 20 in combination with the encoder devices provide an enabling function for the apparatus 10 in which movement of the apparatus across the document is sensed and a signal can be generated to initiate the scanning of an image on the document. If so desired, a push button enable switch (see discussion of switch 54 shown in FIG. 2) or other mechanical release can be included for manual actuation prior to a scanning sequence being permitted to occur.

Figure 3:
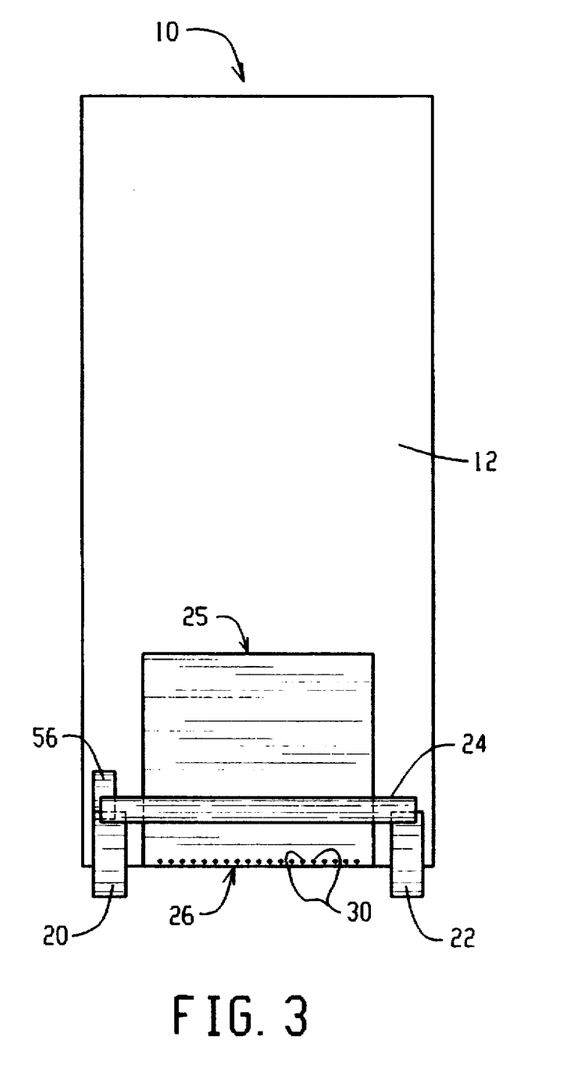
FIG. 3 is a simplified schematic in elevation of a scanning apparatus according to the invention using a full width scan head embodiment.

As best illustrated in FIG. 3, a bottom end of the housing 12 includes an aperture through which scanning is accomplished by a scanner mechanism 25 while the apparatus 10 is positioned adjacent the document.

Note in FIG. 3 that the scanner mechanism 25 includes a scan head 26 which is supported in the housing 12. The scan head 26 in this example consists of a linear array of CCD light sensitive elements 30 which are represented schematically in FIG. 3 by a row of dots. Each of the elements 30 is constrained to view a limited area of the document, representing a single point or pixel, by use of a suitable lens as is known, or an aperture or mask as is also known.

It is understood that each element 30 converts the average light level within the entire area of its view to an electrical signal which is processed as will be described. For this reason the lens, aperture, or mask does not serve to focus an image on each element, but rather serves merely to define the area of the document viewed by each said element 30.

The scanner apparatus 10 can be configured as desired, for example, to operate with gray scale scanning, or more simply to operate from a single bit per pixel to indicate whether the pixel is black or white. The width of the scan head 26 generally defines the height of the scanning area on the document. A suitable CCD device for use in the scan head 26 is part no. IL-C3-1024 available from DALSA Inc., Waterloo, Ontario.

It is further understood that the apparatus 10 can function using only ambient light, but that if supplemental illumination is required for a particular application it may be readily provided by, for example, one or more light emitting diodes (LEDs) disposed to illuminate the area being scanned, as is known.

Figure 2:
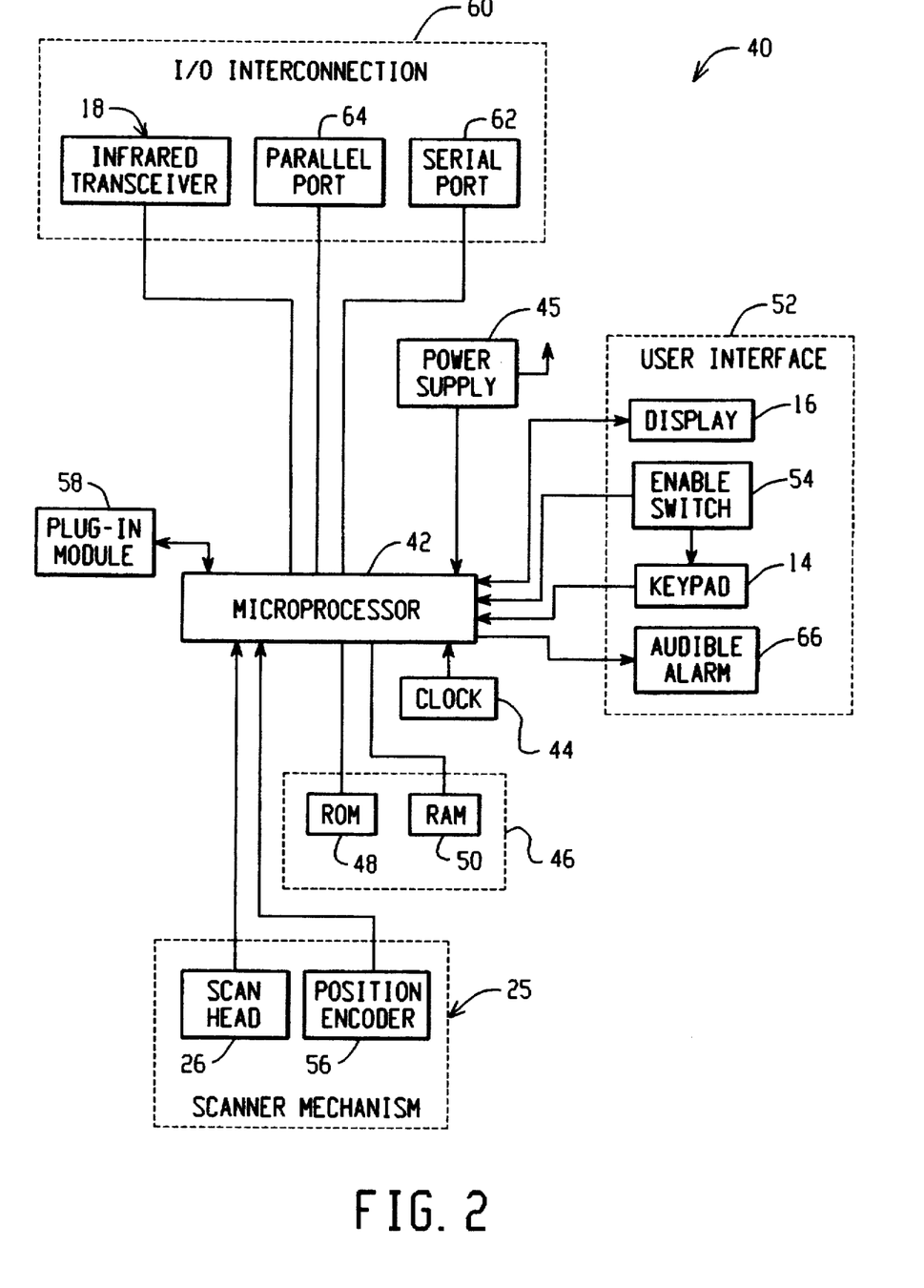
FIG. 2 is an electrical schematic diagram of a control circuit suitable for use with the scanner apparatus of FIG. 1.

With reference next to FIG. 2, there is shown in simplified block diagram form a control circuit 40 suitable for use with all the embodiments of the present invention described herein. Those skilled in the art will readily appreciate that many of the features of this control circuit 40 are optional and can be used or omitted as desired for a particular application. Furthermore, although the circuit 40 is described in terms of a microprocessor based system, the invention can conveniently be practiced with the use of a microcontroller, microcomputer, digital signal processing, application specific integrated circuit (ASIC) and discrete logic circuits depending on the overall complexity of the control functions for a particular application.

In FIG. 2, a microprocessor 42 is connected to a number of peripheral circuits, and is used to provide the overall control function for the apparatus 10. A significant feature of the invention is that the apparatus 10 is a wholly self-contained and operational hand-held scanner that does not require the use of external inputs and controls. Thus, all of the circuits in FIG. 2 are fully contained within the housing 12. However, provision is made for external connection should such a configuration be desired for a specific application. The microprocessor 42 is programmed in a conventional manner according to the manufacturer's instructions, as is well-known to those skilled in the art. A suitable microprocessor is part no. MC6800 available from Motorola Incorporated. For embodiments that utilize additional control and processing functions, it may be desirable to use a more powerful microprocessor such as part no. NS486SXF available from National Semiconductor, Inc.

A system clock 44 provides timing pulses at regular intervals for the operation of the system, including tracking current time and date information. A replaceable or rechargeable battery type power supply 45 provides system power for the microprocessor 42 and all other circuits within the housing 12.

The microprocessor 42 accesses program instructions and data via a memory circuit 46 which includes a nonvolatile ROM memory 48 and a suitable volatile temporary memory, such as a RAM memory 50. The ROM is used to store control programs, conversion tables and the like for the microprocessor 42. The RAM 50 is used to store system data produced during operation such as images read, or an activity log, where the log may include, for example, date and time of the scanning operation. The RAM can further be used to store programs, instructions and data entered manually by the operator through a user interface 52, or received from an external source such as a computer through an input/output (I/O) device 60, or the results of calculations performed by the microprocessor 42. These calculations may include coordinate conversions, distortion compensation, data read from bar codes, and so on. Those skilled in the art will readily appreciate that the volatile memory 50 can also be realized in the form of a FIFO memory, for example. The particular hardware selected for use in realizing the various components of the control circuit 40 will depend on the specific system requirements needed or desired.

The microprocessor 42 reads the electrical signal output of each light sensitive element 30 and stores this information in RAM 50. Depending upon the application of the scanner, this information may be a single bit, "1" or "0" indicating a dark or light image point, or the information may take the form of multiple bits of digital information to indicate shades of gray. Further, it is recognized that three scan heads 26 may be incorporated into a single scanner mechanism 25, with one of the scan heads viewing the image being scanned through a red filter, another through a green filter, and the third through a blue filter, thus providing full color scanning of the image. Alternatively, for example, a single scan head may be equipped with a red/blue/green striped filter to achieve color scanning.

A user interface circuit 52 includes the visual display 16 and the key pad 14. The display 16 is used to view the scanned image during scanning, as illustrated in an exemplary manner in FIG. 1. The display 16 can also be used to communicate warnings (such as low battery or insufficient memory available), status information or a prompt to request data entry. The key pad 14 is used, for example, for selecting instructions to be executed from a menu displayed by the apparatus 10, as well as for command inputs and data entry, such as information for identifying a scanned image.

A manually actuated enable switch 54 is provided, preferably on the housing 12, that the operator operates and holds during a scanning sequence. This prevents accidental operation of the scanning apparatus 10. Note in FIG. 2 that the enable switch 54 also provides a disable function for the keypad 14 (represented by the line between the switch 54 and the keypad 14) during a scanning operation. This prevents accidental actuation of the keypad 14 while the scanner is operating. Actual disable control of the keypad 14 can be effected via the microprocessor 42 in response to actuation of the disable switch 54 by simply having the microprocessor 42 programmed to ignore all keypad 14 commands during a scanning sequence.

A plug-in module 58 is provided so that information, instructions, images, or programs may be transferred between the apparatus 10 and an external apparatus such as, for example, a computer. The module can be, for example, an industry standard PCMCIA card.

A communication link to an external apparatus is accomplished by use of an I/O device 60 such as a serial port 62, a parallel port 64 or a wireless link such as an RF transceiver, or the infrared transceiver 18, an acoustic transducer or a modem. The transceiver 18 may be, for example, a Hewlett-Packard HSDL-1000 transceiver.

The apparatus 10 further includes the scanning mechanism 25, which in the exemplary embodiment includes a CCD scan head 26 and a scan head position encoder 56. The encoder 56 can be, for example, Hewlett-Packard device HEDR-8000. Those skilled in the art will readily appreciate and understand that because the light sensitive elements 30 are fixed in the scan head 26, position data of the scan head 26 can be easily converted into position data for each and every light sensitive element 30 on a real time basis.

In addition to providing position and movement information for the scan head 26, the encoder 56 is also used to indicate to the microprocessor 42 that a scanning sequence is to begin. As the operator begins to sweep the apparatus 10 across the surface of the document, the encoder 56 begins to produce output pulses, so that these pulses can serve as an indication to begin scanning. As used herein, the terms "scanning sequence" and "scanning operation" are used interchangeably to simply refer to the steps carried out between actuation of the apparatus 10 and completion of a scanning function on the medium.

The position encoder 56 provides pulses to the microprocessor 42 as the scan head 26 sweeps across the selected area. These pulses can be counted and timed and thus provide both position and velocity information about the scan head 26, and in particular the light sensitive elements 30 disposed on the head 26. The microprocessor 42 software utilizes the light sensitive element 30 position and velocity information to determine the exact relative position on the document being viewed by each element 30.

The encoder 56 is operably coupled to the rollers 20 that support the apparatus 10 against the document during a scanning sequence. It is important to note that the encoder 56 will produce pulses caused by relative rotation between the scan head 26 and the rollers 20. Therefore, position pulses are produced when the apparatus 10 is swept along the document, and also produced by pivoting motion of the apparatus 10, even if at the time of pivoting the apparatus 10 is sweeping slowly or even stationary. The encoder 56 will also detect backward movement of the apparatus 10. Thus, the encoder 56 output signals can be used for not only controlling scanning during a sweeping operation, but also to compensate for scan head deviations or changes caused by pivoting and other non-linear movements. The encoder 56 can be configured, for example, to produce a pulse for each incremental change in angular displacement of the rollers 20 relative to the scan head 26. By the convenient use of look-up tables, calculations or approximations, the angular displacement of the rollers 20 can easily be converted to actual position data for each element 30. The encoder 56 produces position pulses from the moment that rotation of the rollers 20 occurs relative to the scan head 26.

An audible alarm 66 can conveniently be provided as part of the user interface 52. The audible alarm can serve a number of useful purposes, including an audible tone signal such as a short beep to indicate that a scanning sequence is completed, as indicated by release of the enable switch 54, or a distinguishable audible tone signal that the sequence was not completed, such as, for example, by the operator lifting the apparatus 10 up from the medium before the scanning is completed. The audible alarm 66 can be realized conveniently in the form of an amplifier and speaker controlled by suitable signals from the microprocessor 42 to produce different tones or combination of tones to indicate different conditions.

FIG. 3 is a simplified schematic in elevation of a scanner mechanism 25 equipped with a linear CCD array scan head 26. This scan head 26 is equipped with a plurality of light sensitive elements 30 disposed to scan a full line of length approximately equal to the width of the scan image. If, for example, the scanner 25 is designed to scan a 2" wide image with a resolution of 200 dots per inch (dpi), then the scan head 26 will comprise 400 light sensitive elements at a pitch of 0.005".

The scanner 25 is supported in use by a pair of rollers 20, 22, which are joined by a shaft 24, such that both rollers 20, 22 in this embodiment rotate together. Rollers 20, 22 have outer diameters composed of a material having a high coefficient of friction with paper or other material used for the document, D, such as soft rubber or plastic. Movement of the scanner apparatus 10 in a straight line over the document, on a path perpendicular to the axes of rollers 20, 22, uses significantly less force than movement over other paths, because only rolling motion of the rollers is required. Because of this, the motion of the scanner 25 over the document will inherently tend to track in a straight line path as desired.

An encoder 56 is driven by either of the rollers 20, 22 or the shaft 24. The encoder 56 may be, for example, an optical encoder such as Hewlett-Packard model HEDR-8000, which provides two output channels in quadrature relationship such that both direction and magnitude of rotation are measured. Speed or velocity of rotation and movement can be determined from timing the output pulses of the encoder 56.

Figure 4:
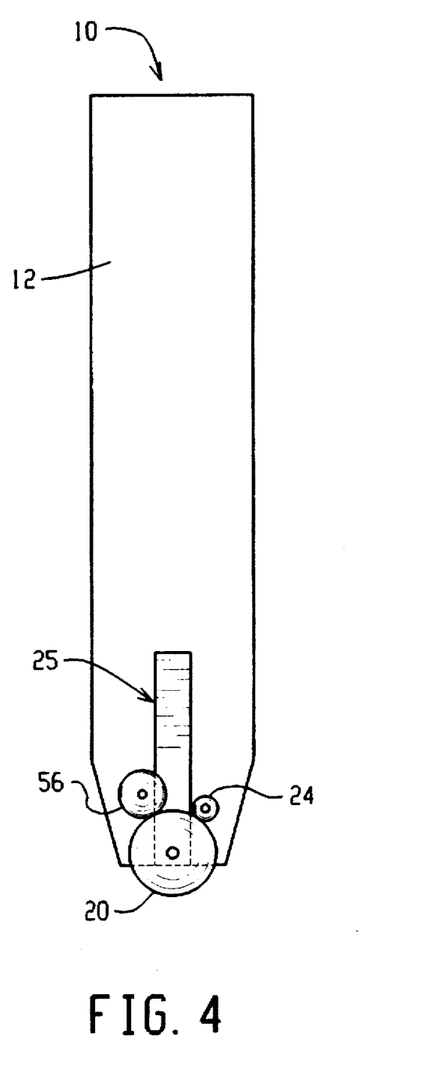
FIG. 4 is a side elevation of the embodiment illustrated in FIG. 3.
Figure 5A:
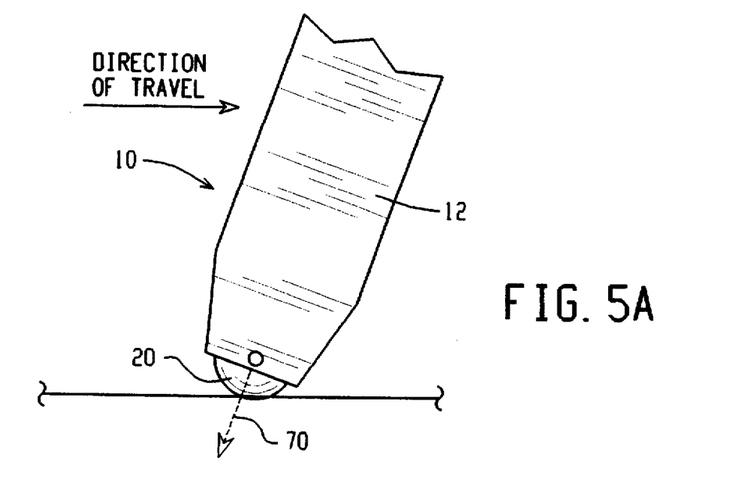
FIGS. 5A and 5B illustrate pivoting motion of the apparatus of FIG. 3.
Figure 5B:
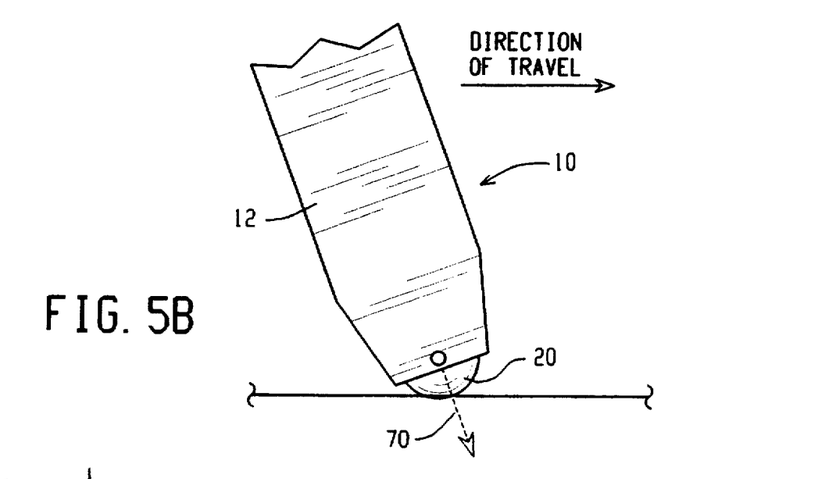

FIG. 4 is a schematic end view of the scanner apparatus 10. Note than in operation, as the scanner 25 is manually moved or swept across an image area on the document, the rollers 20,22 and the shaft 24 rotate. The encoder 56 produces pulses corresponding with the motion of the scan head 26 across the document. In addition, however, the apparatus 10 is free to pivot about the rotational axis of the rollers 20,22. FIGS. 5A and 5B illustrate the effect of such pivoting motion, which, if uncorrected, could either compress or expand the read image, depending upon the direction of the pivoting motion. Pivoting the scanner body 12 forward as in FIG. 5A aims the light sensitive elements 30 backwards as represented by the directional line 70 and decrements the encoder 56 count, simulating backward motion of the scan head 26; while pivoting the scanner body backward as in FIG. 5B aims the light sensitive elements 30 ahead and advances the encoder count thus appearing to be forward motion of the scanner. The encoder 56 count is stored in memory either in the microprocessor 42, the RAM 50 or other memory device, and updated only when a new count exceeds the previous count, and in this manner the encoder count corresponding to the farthest advance of the scanning is stored. Further scanning is enabled only when the encoder count exceeds the previous high count stored in memory. This assures that if the scanner is moved backwards, or pivoted forward, previously scanned information written to RAM 50 by the microprocessor 42 will not be overwritten. Scanning will resume when the scanning mechanism 25 is moved forward, or pivoted backward, sufficiently such that the light sensitive elements 30 view information not previously scanned.

Figure 6:
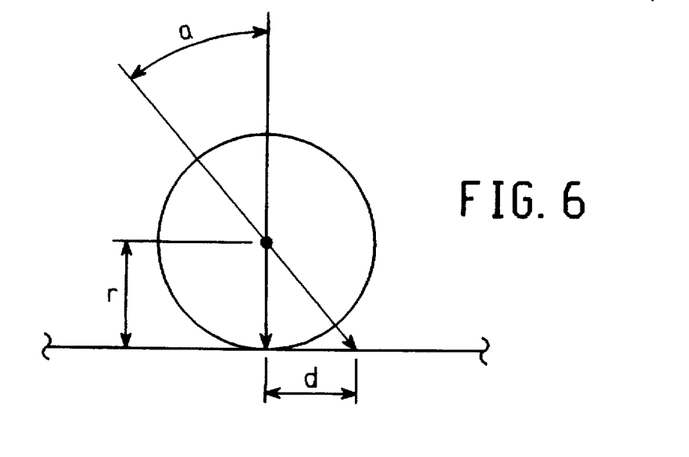
FIG. 6 is a graphical representation of geometric relationships for the light sensitive elements under pivoting motion as in FIGS. 5A and 5B.

It will be appreciated that the change in encoder count resulting from pivoting the apparatus body 12 about the roller 20, 22 axis of rotation does not correspond identically to the change in encoder count produced by a translation of the scan head 26 over the document, and this will result in an insignificant residual error. This can best be illustrated by way of example. Assume, for example, that the scanner rollers have a radius "r," and that the scanner is pivoted backward from the perpendicular by an angle "a," resulting in an advance of the viewed line by a distance "d," as shown in FIG. 6. The magnitude of "d" may be calculated as follows:

$$d = r * \tan a$$

The encoder count will advance by an amount corresponding to a translation "t" of the scanner by a distance equal to that portion of the roller circumference subtended by angle "a." If "a" is in degrees, then:

$$t = (a/360) * 2\pi * r$$

For there to be no error introduced by pivoting the scanner body, then "d" must equal "t," but this is true only at a =0. As the angle "a" increases, so too does the error in viewed position. Continuing with the example, and assuming r=0.25", pivoting the scanner 45° from the perpendicular would introduce an error of 0.054".

At a scanning pitch of 0.01" or less, this would appear to be a significant position error, and it indeed would be if the operator were to hold the scanner stationary on the document and pivot the scanner body 45°. In actual usage, however, the scanner body 12 would be pivoted only as the scanner is translated over the document to effect scanning of the selected area. If the example of a 45° pivot takes place over a translation distance of just 1", then the error of 0.054" is spread over that distance, and results in an insignificant 5.4% compression or expansion of the read image.

By way of example and explanation, an image area to be scanned can be characterized as a matrix of points laid out in a rectangular grid (recognizing that a scanned pattern need not be rectangular at all) having an X axis and a Y axis, with each point being described by a unique set of X,Y coordinates. The X axis is considered the intended direction of scanner travel, and is perpendicular to the Y axis, which is identically the axis of the rollers 20, 22 at the start of a scanning operation. The encoder 56 count increments as the scanner is either advanced along the X axis or tilted backward (relative to the desired direction of travel). The X value for each point is a relative position value along the direction of travel starting from the zero encoder count position when the scanning sequence begins. Each of the light sensitive elements 30 of the scan head 26 produces an output which is proportional to the light intensity striking it, which is in turn a measure of the reflectivity of the point on the document being viewed by said element. The microprocessor 42 stores in the RAM 50 values corresponding to the outputs of each of the light sensitive elements 30 whenever the line viewed by the scan head 26 has advanced by an amount equal to at least one scan line pitch, i.e. the distance between adjacent scan lines, as determined by the intended scan resolution. If the scanner apparatus is intended to nave a resolution of 200 lines per inch, for example, then the scan line pitch will be 0.005".

Figure 7:
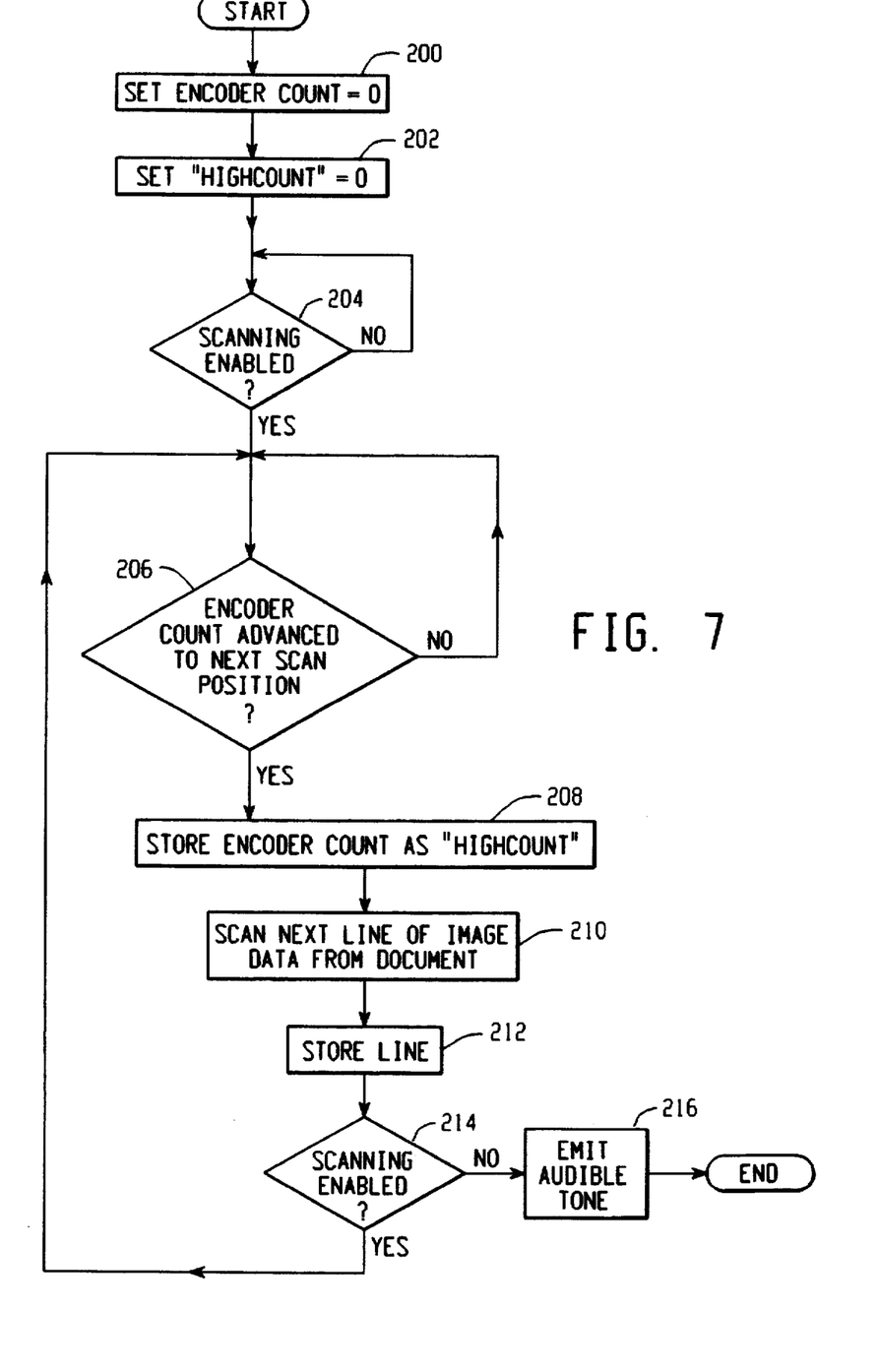
FIG. 7 is a flow chart for a control sequence of a scanning operation in accordance with the invention as embodied in FIGS. 3-5.

FIG. 7 is a flow diagram for a control program suitable for use with the embodiment of FIGS. 3–5. At step 200 the encoder 56 count is zeroed; at step 202 the memory register for the HIGHCOUNT value is zeroed. At step 204, the program tests the status of the enable switch 54 to determine if scanning is enabled. If not, the program loops and waits until scanning has been enabled. If scanning is enabled, the system checks at 206 whether the encoder 56 count has incremented such that the present count exceeds HIGHCOUNT by at least an amount corresponding to the pitch between successive scanning lines, indicating advancing movement of the scan head across the document sufficient for further scanning to Lake place. If yes, then the present count is used to update the HIGHCOUNT value at step 208 and the next line of image data is read at step 210 and stored in RAMP 50 at step 212. At step 214 the program once again tests the status of the enable switch 54. If the scanner is still enabled, the program loops back to step 206. If not, an audible signal is emitted at step 216 and the program ends.

Figure 8:
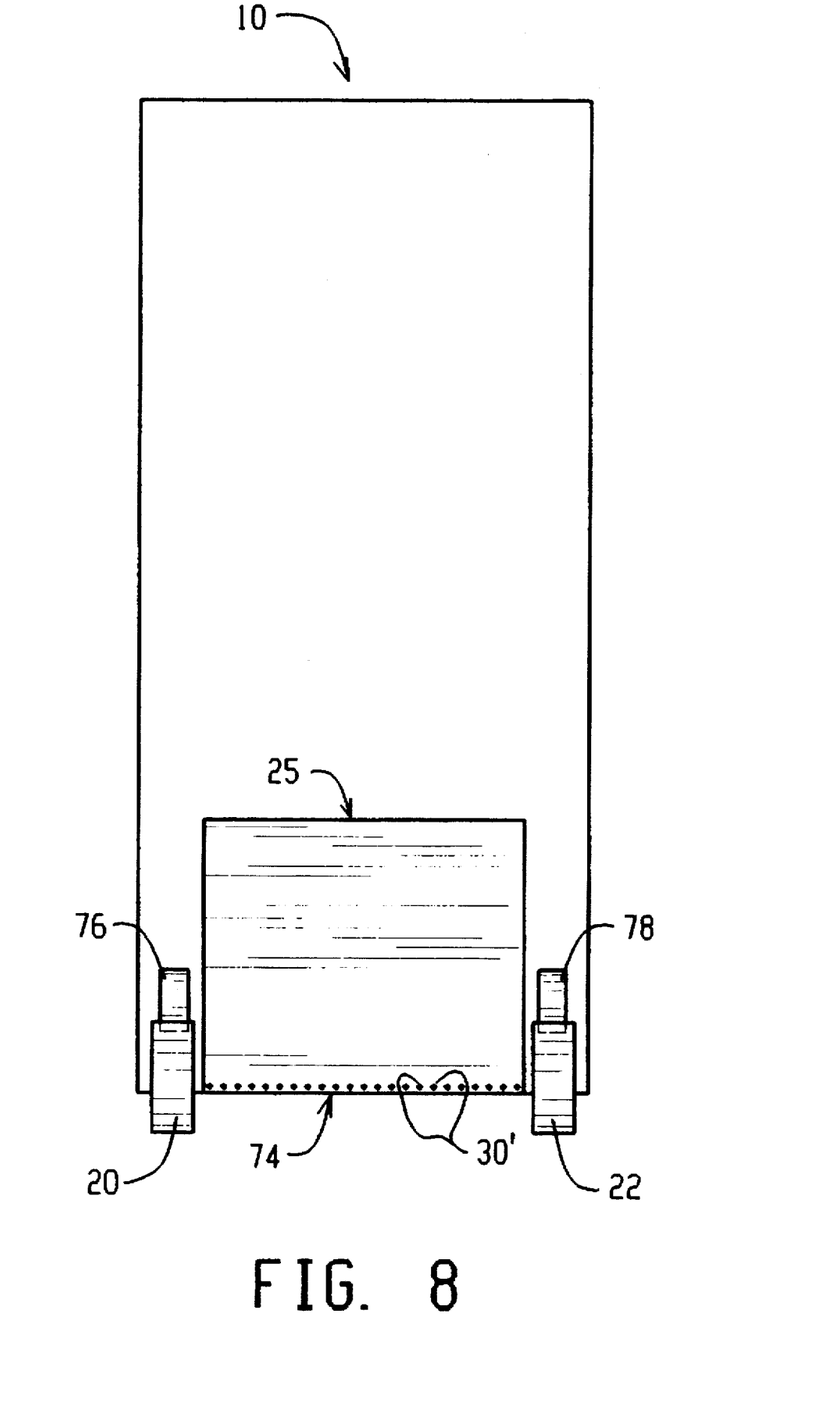
FIG. 8 is an elevation of another embodiment of the invention.

With reference to FIG. 8, another embodiment of the invention is illustrated. In this embodiment, the scanner 25 is equipped with a full line type scan head 74. This scan head 74 is equipped with a plurality of light sensitive elements 30' disposed to scan a full line of length greater than the width of the image to be scanned. If, for example, the scanner is designed to scan a 2" wide image with a resolution of 200 dots per inch (dpi), then the scan head 74 might comprise 500 elements at a pitch of 0.005", and be capable of scanning a 2.5" wide swath.

The scanner 25 is supported in use by the rollers 20, 22 in a manner similar to the embodiment of FIG. 3. However, in contrast to the embodiment of FIG. 3, these rollers are disposed for rotation independently of each other. The rollers 20, 22 can be mounted on a single shaft or separate shafts, but the intent is to achieve completely independent rotation of the rollers with respect to each other.

Each roller 20, 22 drives a respective encoder 76, 78. Each encoder can be of any suitable design, such as Hewlett-Packard model HEDR-8000, with each encoder providing two output channels in quadrature relationship such that both direction and magnitude of rotation of each of the two rollers is independently measured.

The rotationally independent rollers 20, 22 and associated encoders 76, 78, as well as the extra width of the scan head 74, enable electronic compensation for translation of the scanner along a path other than a straight linear path.

Figure 9:
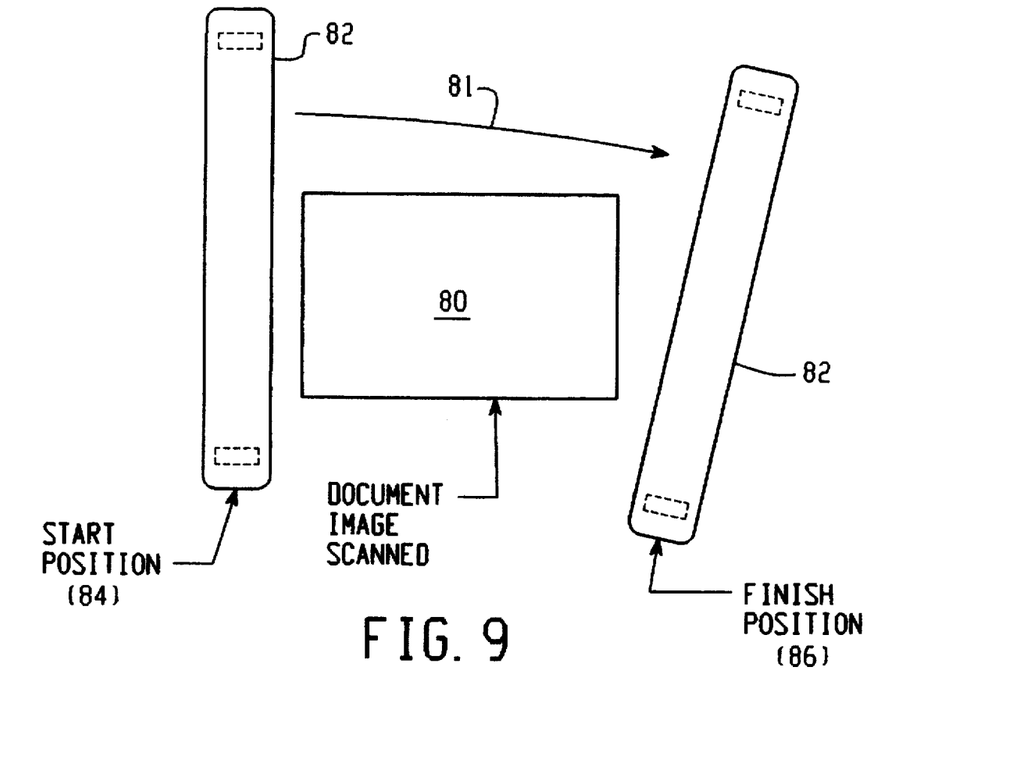
FIGS. 9 and 10 illustrate distortion compensation for scanned images in accordance with the invention.

By way of example, FIG. 9 shows a nominally rectangular image 80 on a document, along with the translation of an uncompensated scanner 82 over a curved path represented by the directional arrow 81 between a starting position 84 and a finishing position 86. This nonlinear, in this case curved, path is typical of that produced due to the user's arm bending at the elbow.

Figure 10:
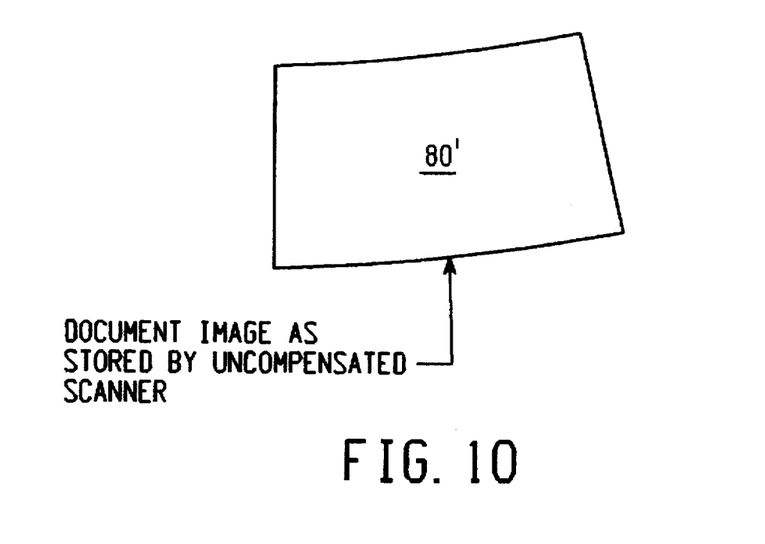

FIG. 10 shows the same rectangular image 80' distorted, as it would be stored in the memory of the scanner 82 due to its motion over the curved path 81. A compensated scanner will store an undistorted representation of the image 80.

Electronic compensation for motion over a curved path is accomplished by calculating the position and orientation of the scanner apparatus 10 relative to a starting point, and then calculating the coordinates of the points on the document viewed by the light sensitive elements 30. Because the actual relative position viewed by each element is known, the image information is written by the microprocessor 42 to the RAM 50 as a correct and undistorted image of the scanned area. Compensation is preferably effected by the use of a scan head 74 that includes a line of light sensitive elements 30 that is larger than the print area, as in the embodiment of FIG. 8. For example, referring to FIG. 9, assume that the light sensitive elements 30 are numbered from 1 to 500, and that the upper line of the scan area 80 shown is initially viewed by element #400. As an uncompensated scanner is moved over the curved path shown, the line is viewed by successively higher numbered elements, with the result that the straight line is stored as if it were a curved line as shown in FIG. 10. With a compensated scanner, assume again that light sensitive element #400 is initially viewing the upper line of the scan area 80. As the scanner is moved over the curved path 81, the line is again viewed by successively higher numbered elements, but in this case the microprocessor 42 calculates that the scanner is moving over the curved path shown. This enables the microprocessor to calculate X and Y offset values for each and every element 30, and further calculate the exact relative position, in terms of X,Y coordinates, viewed by each element. Referring again to FIG. 9, as the scan is completed the upper line of the scan area 80 may be viewed by element #500, for example, but this will no longer cause distortion, as the microprocessor will have calculated that element #500 now views an area having the same Y coordinate as that area initially viewed by element #400.

In the example given, deviation in only one direction was considered, based upon the curving action of an operator's arm motion. Compensation can be made for deviation in only one direction, arcing towards the user as has been described, or compensation can be provided for bidirectional deviation either toward or away from the user, depending upon which set of elements is selected to cover an undeviated print image.

While a simple rectangle has been used for purposes of illustration, it will be appreciated by those skilled in the art that this same compensation technique may be used with any scanned image, no matter how complex. Further, the extent to which a scan area can be compensated is dependent upon both the height of the area, and the number of elements provided. In the example given, with 500 elements disposed over 2.5", and scanning a 2.0" high area, compensation can be made for unidirectional deviations from a straight line of up to 0.5". If the scan area were only 1.5" high, unidirectional deviations of up to 1.0" could be compensated, or, similarly, if 600 elements were provided disposed over 3.0", a 1.0" unidirectional deviation while scanning a 2.0" high area could be compensated.

In addition to compensation for translation of the scanner along a curved path, the encoders 76, 78 enable compensation for forward or backward tilting or pivoting of the scanner 10 with respect to the plane of the document. This may be accomplished by enabling scanning only when the encoder counts exceed the previous high counts, as has previously been described herein.

Figure 11:
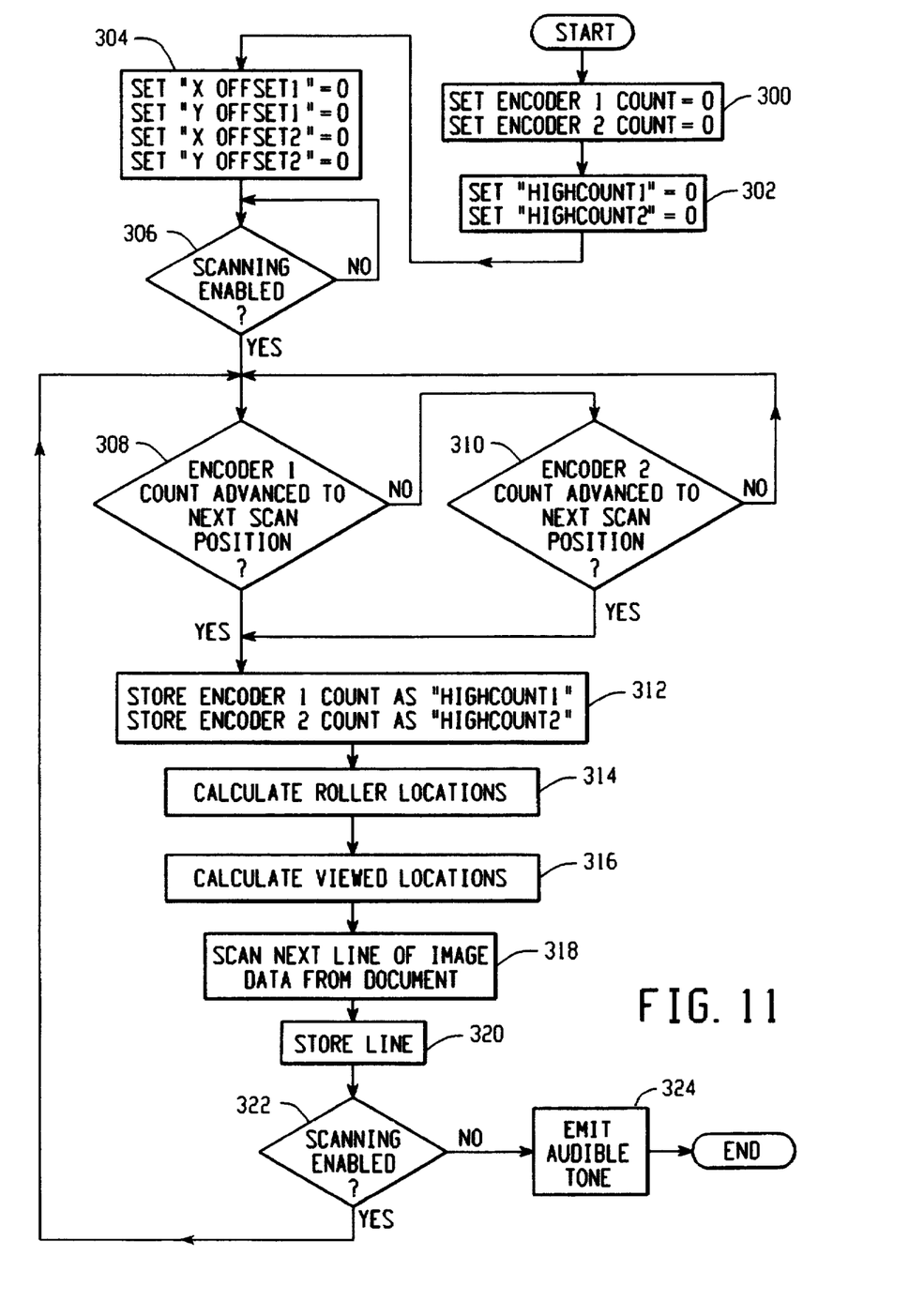
FIG. 11 is a flow chart for a control sequence of a scanning operation in accordance with the invention as embodied in FIG. 8.

FIG. 11 is a flow chart for a scan control program suitable for use with the invention, and in particular the embodiment of FIG. 8, including compensation for image distortion caused, for example, by non-linear movement of the apparatus 10, or tilting or pivoting of the apparatus during a scanning sequence. At steps 300, 302 and 304 the encoder counts, HIGHCOUNT values and OFFSET values are all zeroed. Note that there are two values for each variable, corresponding to the use of two encoders 76, 78.

As described hereinabove with respect to FIG. 7, a scan area can be described as a matrix of points arranged in a rectangular grid, each point having a unique X,Y address or location relative to a zero or reference position which for convenience can simply be the starting position (as manually selected by the operator) of a scanning sequence. Similarly, each of the rollers 20, 22 have a unique X,Y address. For example, define the roller 20, 22 closest to the operator as roller #1, having relative position coordinates X1 and Y1, so that the roller furthest from the operator is roller #2 having relative position coordinates X2 and Y2. The X1 and X2 relative position values are updated as the respective encoder counts increment i.e. the X1 and X2 values correspond to encoder counts though this need not be a one to one correspondence depending on the resolution of the encoders relative to the resolution of the scanner.

At step 306, the program tests the status of the enable switch 54 to determine if scanning is enabled. If not, the program loops and waits until scanning has been enabled. If scanning is enabled, the program checks at step 308 if the encoder 76 count has incremented such that the present ENCODER1 count exceeds the HIGHCOUNT1 value by at least an amount corresponding to the pitch between successive scan lines, indicating advancing movement of the scan head 74 across the scanning area sufficient for further scanning to take place. If yes, then the program advances to step 312. If no, the program proceeds to step 310 and in a like manner zests whether the present ENCODER2 count exceeds the HIGHCOUNT2 value by at least an amount corresponding to the pitch between successive scan lines. If yes the program advances to step 312. If no, the program loops back to step 308 and waits for a positive result at either step 308 or 310, indicating sufficient movement for advancing to step 312 and resuming the scanning operation. At step 312, the HIGHCOUNT1 and HIGHCOUNT2 values are updated with the current respective ENCODER1 and ENCODER2 count values. At step 314, the locations of the rollers 20, 22 are calculated, and at step 316 the locations viewed by the light sensitive elements are calculated so that the points scanned at 318 and stored at 320 have known locations.

In determining the image dot locations, offsets are determined based on the positions of the elements 30 on a real time basis. What is important is to be able to determine the location of each light sensitive element, relative to the starting position, with the counts from the two encoders 76, 78 as the only position indicating information. Knowing the location of each element corresponds to knowing what position each element can view on the document, so that the signal read by the microprocessor 42 from each element can be correctly matched to the location viewed.

Having defined the rollers #1 and #2 hereinabove, further define the roller #1 corresponding encoder 76 count as ENC1 and the change in this count=ΔENC1. Further define the second encoder 78 count as ENC2 and the change in count=ΔENC2. Finally, define the distance between the roller 20, 22 centers as "W", where W is expressed in units of encoder counts (e.g. if W=3.0" and the encoders produce 200 counts/inch, then W=600 counts).

Ideally, the trajectory of the scanner apparatus 10 would be a straight line and indeed typical prior efforts have focussed on techniques for forcing the operator to follow a straight line motion. However, the present invention is directed to providing a more convenient and in a sense forgiving apparatus, recognizing that pure linear movement is unlikely, and in particular due to the pivoting motion of the user's arm, the trajectory will (in whole or in part) instead tend to be an arc, with ENC2>ENC1. This means that at any point along the travel path, the rotational axis of the rollers 20, 22 likely will no longer be perpendicular to the intended path, but will be offset by some angle θ. While an arcing path is used herein for purposes of illustration, this same compensation technique is effective for other, more random, motion errors as well.

Angle θ can be expressed in terms of ENC1 and ENC2. A full circle of radius W counts would have a circumference of 2πW counts, so $$\theta = [ENC2-ENC1]/W \text{ radians}$$

For any θ

$$X\ OFFSET1 = \Delta ENC1 * (\cos \theta)$$

$$X\ OFFSET2 = \Delta ENC2 * (\cos \theta)$$

$$Y\ OFFSET1 = \Delta ENC1 * (\sin \theta)$$

$$Y\ OFFSET2 = \Delta ENC2 * (\sin \theta)$$

For θ from 0 to 0.5(the range of interest), it can reasonably be approximated that sin θ=θ, with a maximum error of just 4.11%, so that:

$$Y\ OFFSET1 = \Delta ENC1 * \theta$$

$$Y\ OFFSET2 = \Delta ENC2 * \theta$$

but, $$\theta = [ENC2-ENC1]/W, \text{ so:}$$

$$Y\ OFFSET1 = \Delta ENC1 * (ENC2-ENC1)/W$$

$$Y\ OFFSET2 = \Delta ENC2 * (ENC2-ENC1)/W$$

Also, for θ from 0 to 0.5, a reasonable approximation is cos θ=1−(θ/5), with a maximum error of just 2.55%, so that:

$$X\ OFFSET1 = \Delta ENC1 * (1 - \theta/5) = \Delta ENC1 * (1 - (ENC2 - ENC1)/5W)$$
$$= \Delta ENC1 - (\Delta ENC1 * (ENC2 - ENC1)/5W)$$

or $$X\ OFFSET1 = \Delta ENC1 - (Y\ OFFSET1/5)$$

similarly, $$X\ OFFSET2 = \Delta ENC2 - (Y\ OFFSET2/5)$$

Using only the encoder counts (and W, which is a constant), the X and Y offsets for each of the rollers are calculated whenever the scanner is moved, as indicated by an increment in either encoder count. By application of these offsets to the previous X,Y coordinates for each of the rollers 20, 22, the exact relative locations of the rollers is known. Since each and every light sensitive element has a known and fixed geometric relationship to the rollers, the exact position on the document viewed by each and every print element (relative to its starting position) is calculated at step 316.

At step 318, the program reads from the scan head 74 the electrical signals corresponding to the average light level reflected from each point calculated at step 316. These signals may be analog, in which case conversion to digital form is performed by a suitable analog to digital converter as is known, (not shown) or these signals may be supplied by the scan head 74 already in digital form.

At step 320 the line is stored in memory, along with position coordinates defining the location of the line relative to the starting position. It is understood that this scan line will lie generally parallel to the axis of the rollers 20, 22 but not necessarily parallel to the Y axis, due to possible translation of the scanner along a curved path. The complete scan image will, nonetheless, bear its proper, undistorted relationship to the X and Y axes because of the real time compensation carried out as described hereinabove.

As further enhancements to the utility and flexibility of the self-contained hand-held scanning apparatus described hereinabove, those skilled in the art will appreciate that the use of an internal control circuit, such as the circuit 40 herein that uses a microprocessor 42 and memory circuit 46, facilitates incorporating additional user functions with the hand-held scanner apparatus 10. Such additional features will now be described in terms of additional exemplary embodiments of the invention, including voice recording and play back, voice recognition and synthesis, and printing capability.

Figure 12A:
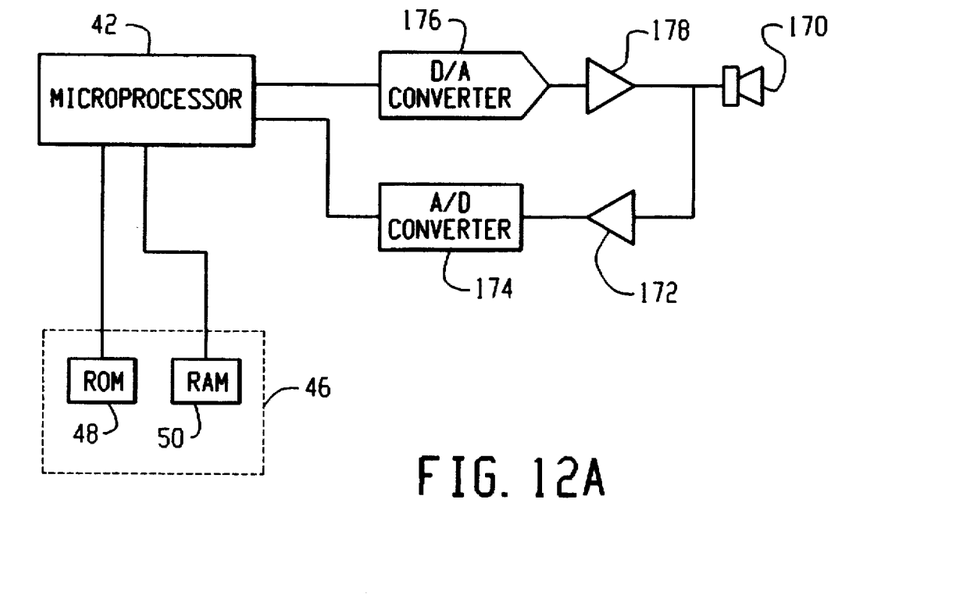
FIGS. 12A and 12B illustrate an additional feature of the invention incorporating audio input and output.

Referring to FIG. 12A, with the addition of a suitable transducer 170, amplifiers 172, 178, an analog to digital converter (A/D converter) 174, and a digital to analog converter (D/A converter) 176, the hand-held scanner 10 gains the capability to serve as an audio recording and playback device. The recording time available will be limited only by the amount of memory available.

A suitable transducer 170 is a simple electromagnetic speaker or microphone, or a ceramic or crystal piezoelectric element, or any of various other devices commercially available, such as model WM-70S1 available from Panasonic. A single transducer may serve as both speaker and microphone, or two separate transducers may be used. When recording, the transducer 170 functions as a microphone, whose signal may be boosted to an appropriate level by the amplifier 172, the output of which is applied to the A/D converter 174. The A/D converter 174 converts the analog signal into digital form which can be stored in memory 46 by the microprocessor 42. At playback, the opposite process takes place, with the microprocessor 42 reading the stored digital message from memory, and applying the digital signal to the D/A converter 176. The output of the D/A converter 176 is an analog signal which is then amplified by an amplifier 178 to an appropriate level and applied to the transducer 170, which now functions as a speaker. The amplifiers 172, 178 may be selected from any number of suitable solid-state integrated circuit devices made for such purposes, and may, in fact, be integrated with their respective converters. Similarly, the A/D and D/A converters may be standard devices readily available and well-known. Some microprocessors contain such converters as an integral part, in which case separate devices are not needed.

Figure 12B:
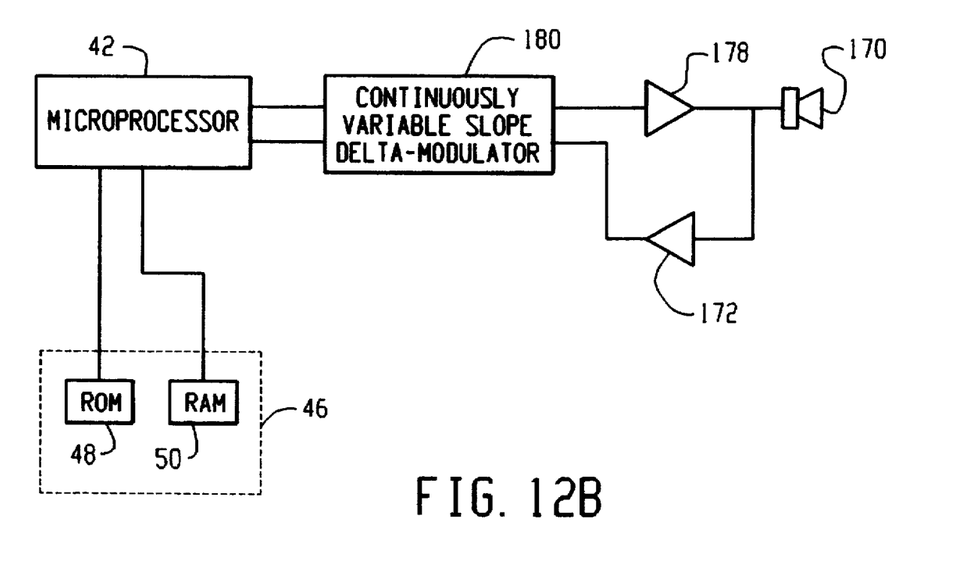

With reference to FIG. 12B, a delta-modulation technique provides an alternative and efficient method for audio signal digitization with reduced data rate and memory size requirements. An integrated circuit continuously variable slope delta-modulator 180 performs the A/D and D/A conversion functions with delta modulation, as well as automatic gain control. A suitable device for the circuit 180 is part no. HC-55564 available from Harris Corporation.

Further, with appropriate voice recognition software, the apparatus 10 can be made responsive to voice commands and data inputs. Spoken annotations can be recorded, for example, to identify scanned images. Such images could then be retrieved for display in response to a spoken request for that particular image. Similarly, voice synthesis software could be used to provide spoken communications from the scanner to the user, such as, for example, "insufficient memory".

The hand-held scanner 10 as described can further be provided with printing capability so as to function as a compact copier. Scanned images could be retrieved not only for display or transmission to other apparatus, but printed on a suitable medium when the apparatus is equipped with an appropriate printing mechanism. Such a mechanism is described in the above-identified co-pending patent application Ser. No. 08/554,043. In this embodiment, the handheld scanner and the printer may beneficially share many components, including, for example, the display, key pad, housing, microprocessor, memory, battery power supply, I/O interconnections, etc.

The present invention thus provides a fully self contained and hand-held scanner apparatus that can scan a selected portion of a document with electronic compensation for distortion caused by a nonlinear scanning path and pivoting motion of the scanner.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. A hand-held and self contained electronic scanning apparatus for scanning information on a document disposed outside the apparatus, comprising: a housing that can be manually positioned adjacent a surface of the document and manually swept across a selected scanning area of the document during a scanning sequence; a scanner disposed in the housing and having a scan head with a plurality of scan elements for scanning information within the scanning area; and electronic control means disposed in the housing for controlling the scanner to scan information on the document during a scanning sequence, said control means comprising compensation means for reducing scanned image distortion caused by movement of said scan head along a non-linear path during a scanning sequence.

2. The apparatus of claim 1 further comprising user interface means for inputting scanning and control commands to a memory disposed in said housing.

3. The apparatus of claim 1 wherein print head comprises a plurality of light sensitive elements.

4. The apparatus of claim 1 further comprising means for sensing and indicating correct position of said scan head with respect to the document to enable a scan sequence.

5. The apparatus of claim 1 wherein said electronic control means compensates to reduce distortion in a scanned image caused by rotation of said scan head about an axis parallel to said scanning area on the medium.

6. The apparatus of claim 1 wherein the apparatus is supported on the medium during a scanning sequence by a roller operably coupled to an encoder.

7. The apparatus of claim 1 wherein the apparatus is supported on the medium during a scanning sequence by a plurality of rotatably joined rollers.

8. The apparatus of claim 7 wherein said plurality of said rollers are operably coupled to an encoder.

9. The apparatus of claim 1 wherein the apparatus is supported on the medium during a scanning sequence by a plurality of rotatably independent rollers.

10. The apparatus of claim 9 wherein each of said plurality of said rollers is operably coupled to a respective encoder.

11. The apparatus of claim 1 further comprising an encoder that produces an output used to determine scan head position during a scanning sequence.

12. The apparatus of claim 11 wherein said control means determines the document position viewed by each scan element during a scanning sequence as a function of said encoder output.

13. The apparatus of claim 1 wherein said control means comprises a memory that electronically stores a plurality of scanned images.

14. The apparatus of claim 1 further comprising user interface means disposed in the housing for an operator to select a number of said stored images.

15. The apparatus of claim 14 wherein said user interface means comprises a keypad and visual display devices that are used by the operator to view an image.

16. The apparatus of claim 2 wherein said memory stores a control program and instructions such that the apparatus is manually operational in a stand alone configuration independent of electronic input controls from an external source.

17. The apparatus of claim 1 further comprising communications means disposed in the housing for transmitting instructions, commands and data between said apparatus and an external control device.

18. The apparatus of claim 17 wherein the external device comprises a personal computer.

19. The apparatus of claim 17 wherein said communication means comprises a wireless link between said apparatus and the external device.

20. The apparatus of claim 17 wherein said communication means is a device selected from the group consisting of: an RF transceiver, acoustic transceiver, optical transceiver, modem, serial port and parallel port.

21. The apparatus of claim 1 wherein said control means accepts a plug-in module for transferring information between the apparatus and an external source.

22. The apparatus of claim 1 further comprising a sensor that enables a scanning sequence when the apparatus is correctly positioned with respect to the medium.

23. The apparatus of claim 1 wherein said scanner includes means for scanning images in a number of colors.

24. The apparatus of claim 1 wherein said control means dynamically compensates to reduce distortion in a scanned image caused by pivoting motion of the apparatus during a scanning sequence.

25. The apparatus of claim 24 wherein said control means further compensates for distortion caused by nonlinear movement of the scan head across the scanning area.

26. The apparatus of claim 1 where said compensation means determines the exact position viewed on the document being scanned by each individual scan element, where the document position viewed is determined based on an encoder.

27. The apparatus of claim 26 wherein said scan elements comprise a scan head, with said scan head extending over a length that is greater than the width of said scanning area.

28. The apparatus of claim 1 further comprising a manually actuated enable switch that enables operation of the scanner and inhibits keypad control during a scanning sequence.

29. The apparatus of claim 1 further comprising an audible signal source for indicating completion of a scanning sequence.

30. The apparatus of claim 1 further comprising means for audio input, audio storage and audio output.

31. The apparatus of claim 1 further comprising printing means.

32. A method for scanning information on a document disposed outside the apparatus using a hand-held self-contained scanning apparatus, comprising the steps of:

(a) manually positioning a housing adjacent a surface of the document and manually sweeping the housing across a selected scanning area of the document during a scanning sequence;

(b) scanning information within the scanning area using an optical scanner in the housing having a plurality of scan elements that convert scanned information into an electronic image; and (c) compensating the electronic image to reduce scanned image distortion caused by non-linear movement of the housing during the scanning sequence by detecting positions of said scan elements during a scanning sequence and storing the electronic image based on said detected scan element positions.

33. The method of claim 32 wherein the step of compensating the electronic image to reduce distortion includes the step of storing output signals produced by said scan elements in a memory, wherein the signals for each scan element are stored based on position and movement of the scan element.

34. The method of claim 33 wherein the electronic image is electronically compensated for distortion caused by pivoting movement of the housing by storing each scan element output signal only when the scan element views a previously unscanned location in the scanning area.

35. The method of claim 33 wherein the electronic image is electronically compensated for distortion caused by non-linear translational movement of the housing across the scanning area.

36. The method of claim 35 wherein distortion for non-linear movement is compensated by detecting position of a number of scan elements arranged along a length that is greater than the scanning area.

37. A hand-held and self contained electronic scanning apparatus for scanning indicia on a medium disposed outside the apparatus, comprising: a housing that can be manually positioned adjacent a surface of the medium and manually swept across a selected scanning area on the medium during a scanning sequence; a scanner disposed in the housing and having a scan head with a plurality of scan elements for scanning indicia on the medium within the scanning area; and electronic control means disposed in the housing for controlling the scanner to scan indicia on the medium during a scanning sequence, said control means comprising compensation means for reducing scanned indicia distortion caused by a pivoting rotational movement of the scan head about an axis during a scanning sequence.

38. The apparatus of claim 37 wherein said compensation means reduces scanned indicia distortion caused by rotational movement of the scan head about an axis perpendicular to the scanning area during a scanning sequence.

39. The apparatus of claim 37 wherein said compensation means reduces scanned indicia distortion caused by a pivoting rotational movement of the scan head about an axis parallel to the scanning area during a scanning sequence.

40. Method for scanning indicia on a medium disposed outside the scanning apparatus, using a hand-held electronic scanning apparatus self-contained within a housing, comprising the steps of:

positioning the housing adjacent a surface of the medium and manually sweeping the apparatus across a scanning area on the medium during a scanning sequence;

scanning indicia on the medium within the scanning area, using a scan head having a plurality of scanning elements, as the apparatus is swept across the scanning area; and compensating for scanned indicia distortion caused by a pivoting rotational movement of the scan head about an axis during a scanning sequence.

41. The method of claim 40 comprising the step of compensating for scanned image distortion caused by rotational movement of the scan head about an axis perpendicular to the scanning area during a scanning sequence.

42. The method of claim 40 comprising the step of compensating for scanned image distortion caused by a pivoting rotational movement of the scan head about an axis parallel to the scanning area during a scanning sequence.

* * * * *

UNITED STATES PATENT AND TRADEMARK OFFICE
CERTIFICATE OF CORRECTION

PATENT NO. : 5,595,445
DATED : January 21, 1997
INVENTOR(S) : Howard H. Bobry

It is certified that error appears in the above-indentified patent and that said Letters Patent is hereby corrected as shown below:

Column 3, line 20, after "area" delete "-".
Column 5, line 10, after "0" insert --,--.
Column 8, line 40, delete "nave" and insert --have--.
Column 8, line 55, delete "Lake" and insert --take--.
Column 8, line 58, delete "RAMP" and insert --RAM--.
Column 10, line 66, delete "zests" and insert --tests--.
Column 14, line 15, after "wherein" change "print" to --said scan--.
Column 16, line 27, delete "rotational".
Column 16, line 35, delete "rotational".
Column 16, line 50, delete "rotational".
Column 16, line 58, delete "rotational".

Signed and Sealed this

Fifteenth Day of April, 1997

Attest:

BRUCE LEHMAN

Attesting Officer

Commissioner of Patents and Trademarks